United States Patent [19]
Roche

[11] 4,286,802
[45] Sep. 1, 1981

[54] OLEOPNEUMATIC SUSPENSION WITH TELESCOPIC LEG FOR VEHICLES

[75] Inventor: Alain-Gilbert Roche, Massy, France

[73] Assignee: Societe Anonyme Automobiles Citroen, France

[21] Appl. No.: 116,799

[22] Filed: Jan. 30, 1980

[30] Foreign Application Priority Data

Feb. 2, 1979 [FR] France ............................. 79 02801

[51] Int. Cl.³ ............................................. B60G 3/00
[52] U.S. Cl. .................................... 280/693; 280/708; 267/64.26; 188/312
[58] Field of Search ............... 280/693, 708, 691, 692; 267/64 R, 64 A, 15 A; 188/312, 316

[56] References Cited

U.S. PATENT DOCUMENTS

| 2,243,782 | 5/1941 | Thornhill | 267/64 R |
| 2,844,367 | 7/1958 | Mercier | 267/64 A |
| 3,290,037 | 12/1966 | Robinson | 267/64 B |
| 3,690,425 | 9/1972 | Willich | 280/693 |
| 3,933,344 | 1/1976 | Taylor | 267/64 A |

FOREIGN PATENT DOCUMENTS

| 1153848 | 3/1958 | France . |
| 1385242 | 3/1964 | France . |
| 2200723 | 6/1974 | France . |
| 2236117 | 1/1975 | France . |
| 1148506 | 12/1975 | France . |
| 2338421 | 8/1977 | France . |

Primary Examiner—Robert R. Song
Attorney, Agent, or Firm—Stevens, Davis, Miller & Mosher

[57] ABSTRACT

A telescopic leg suspension comprising a lower wheel-supporting element connected by an articulated lever to the structure of the vehicle, an upper element articulated to the structure and serving to guide the lower element, these two elements being able to slide and possibly rotate in relation to each other and a device for causing pressurized liquid to act between the elements in such a way that the liquid tends to separate these two elements axially one from the other.

One of the two elements comprises a tubular member having at one end a bore and a piston adapted to slide sealingly in this bore, the pressurized liquid being contained in this member whereas the other element comprises a cylinder surrounding the member, this cylinder being closed at one end by a bottom against which the piston bears, guiding between the two elements being provided between the cylinder and the member.

This invention applies more particularly to a suspension for a motor vehicle steering wheel.

13 Claims, 5 Drawing Figures

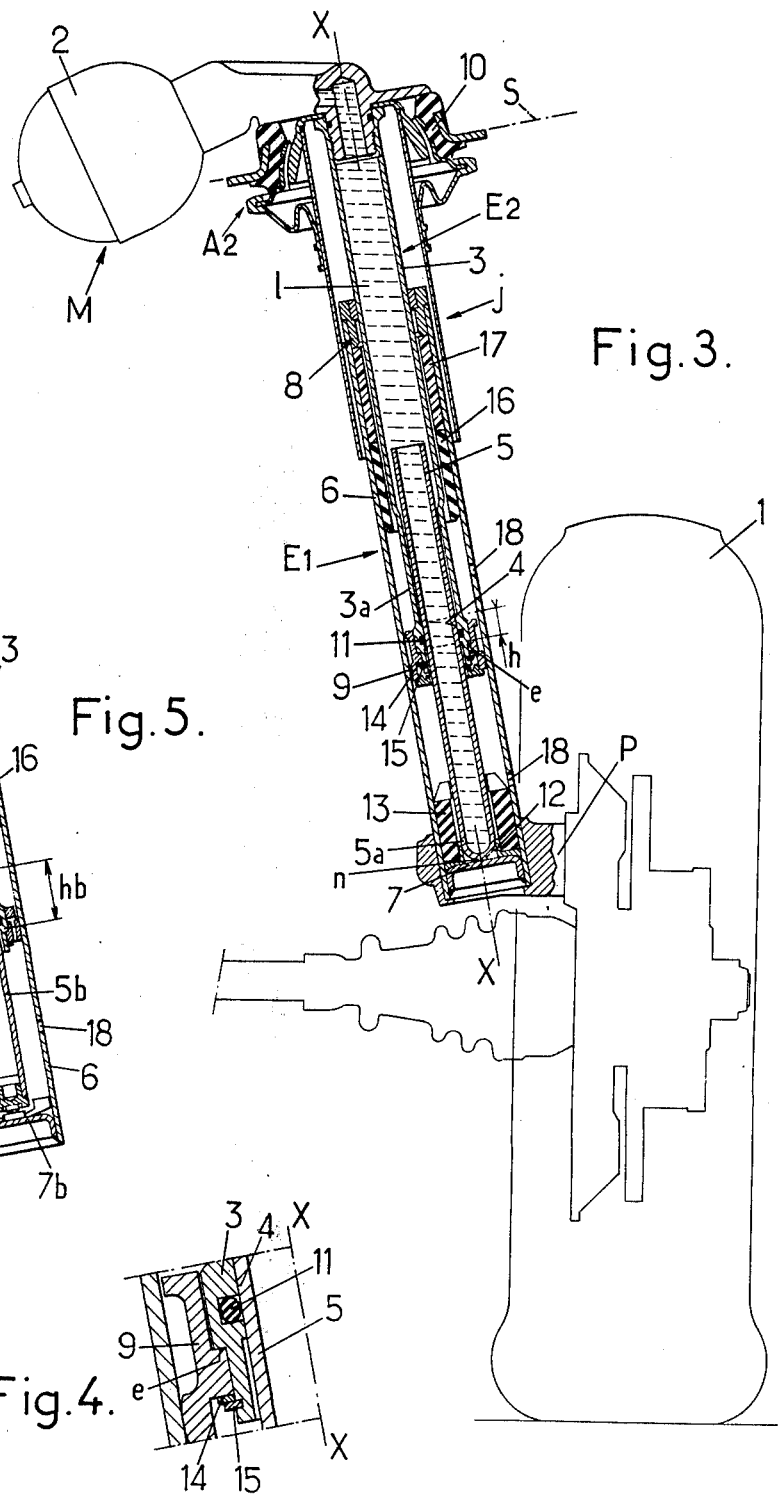

OLEOPNEUMATIC SUSPENSION WITH TELESCOPIC LEG FOR VEHICLES

BACKGROUND OF THE INVENTION

The invention relates to oleopneumatic suspensions having a substantially vertical telescopic leg, particularly for vehicle steering wheels, of the kind which comprise:

a lower wheel-supporting element connected by a substantially transverse articulated lever to the structure of the vehicle;

an upper element articulated to the structure of the vehicle and serving as a guide for the lower element, these two elements being able to slide and, if required, rotate in relation to each other;

and means for causing pressurized liquid to act between the elements in such a way that this liquid tends to separate the two elements axially one from the other.

The invention concerns more particularly, but not exclusively, a suspension for the steering wheel of a motor vehicle having a source of pressurized liquid, the liquid of the suspension being then under high pressure.

It is known generally that in suspensions of the kind in question the relative sliding of the two elements is accompanied by parasitic transverse stresses which hinder the sliding and, possibly, the rotation; in the case of an oleopneumatic suspension, these transverse parasitic stresses make it more difficult to obtain a satisfactory seal for the pressurized liquid, all the more so the higher the pressure of the liquid.

The invention has as its aim especially to make suspensions of the kind in question such that they answer better than heretofore the different requirements of practice and particularly such that they solve simply and efficiently the problem of guiding during sliding and, possibly, during rotation despite the parasitic transverse stresses and the sealing problem.

SUMMARY OF THE INVENTION

According to the invention, an oleopneumatic suspension having a substantially vertical telescopic leg of the kind described above is characterized by the fact that one of the two elements comprises a tubular member having at one end a bore and a piston adapted to slide sealingly in this bore in a direction parallel to the axis of the telescopic leg, the pressurized liquid being contained in the inner volume of this tubular member closed by the piston, whereas the other element comprises a cylinder surrounding the tubular member and coaxial to this latter, this cylinder being closed at one end by a bottom against which said piston bears, guiding during sliding, and possibly during rotation, between the two elements being provided in a manner known per se between said cylinder and said tubular member.

With this arrangement, the piston which transmits axial thrust forces is not subjected to the transverse parasitic stresses so that sealing of the sliding of the piston may be obtained under good conditions and the section of this piston may be small; guiding between the two elements is provided by means of heavy section parts, adapted to easily resist the transverse parasitic stresses, no sealing against a pressurized liquid is needed between said parts.

According to a first possibility, the tubular member and the piston belong to the upper element of the telescopic leg; the means for causing the pressurized liquid to act in this tubular member comprise an oleopneumatic accumulator which is, in this first solution, advantageously fixed to the structure (suspended part) of the vehicle; the lower element comprises a cylinder surrounding the tubular member.

According to another solution, said tubular member and the piston belong to the lower element, whereas the cylinder, surrounding the tubular member, belongs to the upper element and is articulated to the structure of the vehicle; in this second solution, the oleopneumatic accumulator is generally fixed to the lower element.

In all cases, the tubular element is preferably slidably, and if need be rotatably, mounted in this cylinder by means of two bearings disposed respectively at the open end of this cylinder and at the end of the tubular member housed in the cylinder.

Advantageously, the bearing situated at the end of the tubular member housed in the cylinder is mounted axially interlocked with this tubular member but free to rotate so as to reduce, particularly when the element articulated to the structure is locked against rotation, the resistant torques due to friction which oppose the rotation of the wheel-supporting lower element.

Stops are provided for limiting the relative sliding of the two elements; these stops are advantageously formed by two elastomer sleeves disposed radially inside the cylinder and axially situated towards the ends of the cylinder.

In the case where said freely rotating bearing is provided, the stops are situated on each side of this bearing which cooperates at the end of its travel with one or the other of said stops.

The piston may be formed by a hollow cylindrical body closed at its end abutting against the bottom of the cylinder and open at its other end which opens into the inner volume of the tubular member.

The axial length of the bore of this tubular member may be sufficient to ensure satisfactory guiding of the piston; however, a ring may be provided having an inner diameter adjusted to that of the piston which is centred at the lower part of the cylinder and disposed partly in the inner volume of a range of movement stop; the axial length of the guide bore of the tubular member may then be reduced, the ring serving to centre the piston.

The invention also relates to a motor vehicle equipped with a suspension in accordance with the invention.

The above and other objects, features and advantages of the present invention will become apparent from the following description given solely by way of non limiting illustration, when taken in conjunction with the accompanying drawings.

DESCRIPTION OF THE DRAWINGS

FIG. 3 is a cross section of a suspension according to the invention.

FIG. 4 shows on a larger scale a detail of FIG. 3.

FIG. 5, finally, shows a variation for guiding the piston of FIG. 3.

DESCRIPTION OF THE PREFERRED EMBODIMENTS

Figure 1:
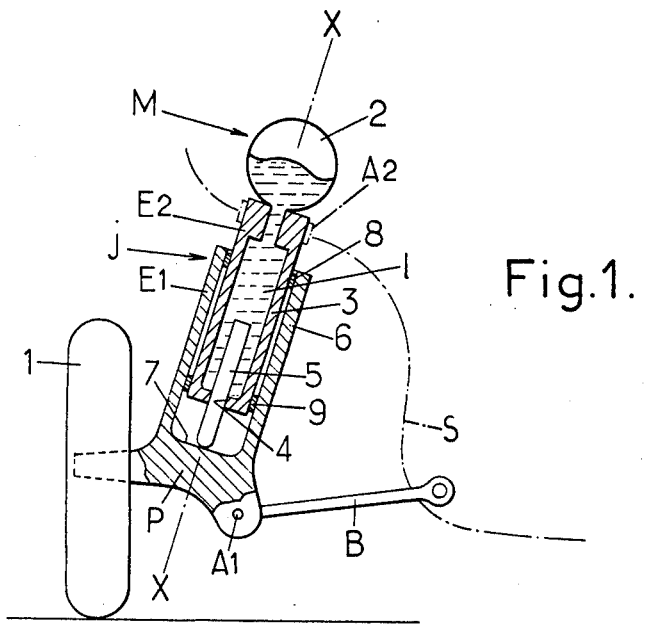
FIG. 1 of these drawings is a schematical view in cross section of a suspension in accordance with the invention.
Figure 2:
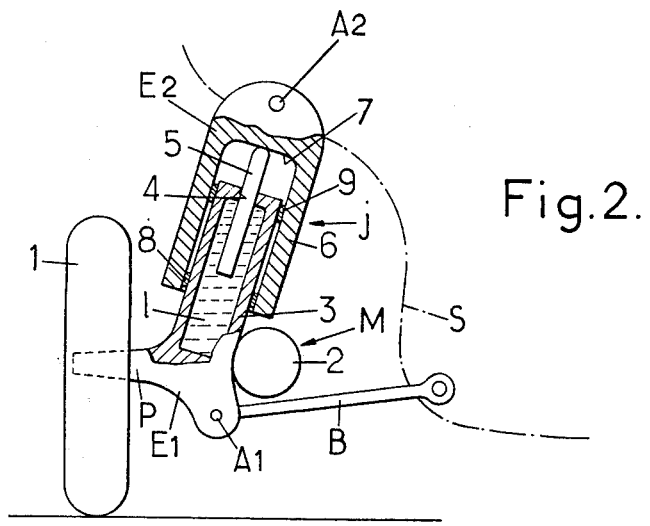
FIG. 2 shows, similarly to FIG. 1, another embodiment.

Referring to the drawings and more particularly to FIGS. 1 to 3, there is shown an oleopneumatic suspension having a substantially vertical telescopic leg j for the steering wheel of a motor vehicle. This suspension comprises a lower element E1 integral with pivot P of wheel 1 and serving as a support for this wheel.

This lower element E1 is connected to the structure S of the vehicle by means of a lower substantially transverse swinging lever B articulated at its ends respectively at A1 to the lower element E1 and to the structure S. The telescopic leg comprises furthermore an upper element E2 articulated towards its upper part at A2 to structure S.

The two elements E1 and E2 may slide in relation to each other; furthermore, it frequently happens that the upper element E2 is locked against rotation with respect to structure S so that the two elements E1 and E2 must also be able to rotate in relation to each other. There are however cases in which element E2 is rotatably mounted in structure S so as to be able to rotate with the lower element E1.

Means M are provided for causing pressurized liquid 1 to act between elements E1 and E2 in such a way that this liquid tends to separate the two elements axially one from the other. These means M comprise a conventional oleopneumatic accumulator 2 containing a pressurized gas separated from the liquid by a resilient membrane; the variations in volume of the pressurized gas absorb the movements of the liquid maintained under pressure; the part of this accumulator 2 containing the liquid is connected to a pressurized liquid source, mounted on the vehicle, and not shown in the drawings.

One of the two elements E1, E2 comprises a tubular member 3 having at one end a bore 4 and a piston 5 adapted to slide sealingly in this bore in a direction parallel to the axis X—X of the telescopic leg; generally, this piston 5 is coaxial with this leg j. The pressurized liquid 1 is contained in the inner volume of this tubular member 3 closed by piston 5.

The other element comprises a cylinder 6 surrounding the tubular member 3 and coaxial therewith; this cylinder is closed at one end by a bottom 7 against which said piston 5 bears.

The slidable, and possibly rotatable, guiding between the elements is provided between cylinder 6 and tubular member 3 by means of bearings 8, 9 provided respectively at the open end of cylinder 6 and at the end of tubular member 3 housed in the cylinder.

In the solution of FIGS. 1 and 3, upper element E2 comprises said tubular member 3 and piston 5; the oleopneumatic accumulator 2 is then advantageously fixed to structure S (suspended part of the vehicle), the pressurized liquid supply for tubular member 3 being provided towards its upper part; the lower element E1 is formed by cylinder 6.

According to the solution of FIG. 2, lower element E1 is formed by tubular member 3 and piston 5, whereas the upper element E2 is formed by cylinder 6; the oleopneumatic accumulator 2 is then fixed to the lower element E1.

Reference will now be made to FIG. 3 showing the detail of one embodiment, transverse arm B not however being shown in this Fig.

As already pointed out previously, upper element E2 is formed by tubular member 3 and piston 5 which are situated inside cylinder 6 of the lower element E1. The articulation A2 of the upper element E2 to structure S comprises an elastomer cushion 10; element E2 is secured against rotation with respect to structure S. The oleopneumatic accumulator 2 is formed by a sphere forming a pressurized gas container which forms the suspension spring; inside this sphere there is disposed in a known way a system of damping (not visible) which consists in braking the liquid flow resulting from the sliding of piston 5 which sealably slides, owing to seal 11, in bore 4. The axial length of this bore 4 is shown by h.

Mounting of piston 5 is provided so that this latter has to withstand a minimum of transverse stresses.

According to a first possibility, shown in FIG. 3, the axial length h of bore 4 is small and, at its end 5a abutting against bottom 7, piston 5 is maintained in position by a ring 12 made from a material which ensures a low coefficient of friction between piston 5 and said ring; this latter may be made from a low friction coefficient plastic material. This ring 12 is centred at the lower part of cylinder 6 and disposed partly in the inner volume of a range of movement stop 13 formed by an elastomer sleeve serving to limit the relative sliding of elements E1 and E2 in the direction corresponding to the maximum loads.

According to another possibility shown in FIG. 5, the axial length hb of bore 4b is considerable and sufficient for this bore alone to provide guiding for piston 5b; this latter then bears only at 5c in the axis of the telescopic leg against bottom 7b without centring.

Referring again to FIG. 3, it can be seen that bearing 9 provided at the lower end of tubular member 3 is stopped on the lower end of this member by conventional means such as an external shoulder e of member 3 and a ring 14 maintained against the end of member 3 by a resilient ring 15 anchored in a peripheral groove provided at the end of this member 3.

Bearing 9 is mounted so as to be able to freely rotate about the end of member 3 while still being axially tied to this member.

Another counter stop 16 is provided for limiting the amplitude of the relative sliding of elements E1, E2. This stop 16, like stop 13, is disposed radially between tubular member 3 or piston 5 and the inner wall of cylinder 6. This stop 16 is formed by an elastomer sleeve fitting slightly tightly in the bore of cylinder 6; this stop 16 is in upper abutment against bearing guide 8 integral with the upper end of cylinder 6, particularly by screwing, through a spacer tube 17 preferably made from a plastic material, which is not deformed during compression of stop 16.

The lower part 3a of tubular member 3 is made thinner, i.e. its outer diameter is smaller so as to allow stop 16 to be crushed by rotary bearing 9 at the end of travel corresponding to the maximum extensions of the telescopic leg.

In fact, stops 13 and 16 are situated on each side of this bearing 9 and cooperate therewith at the end of travel in one or the other direction.

Piston 5 may be formed by a hollow body closed at its end 5a adjacent the bottom of the cylinder and open at its end opening into member 3; in this case, piston 5 is filled with pressurized liquid. The rounded end 5a is provided with a projecting bearing surface n, providing a small surface, even pinpoint, contact against bottom 7, so as to reduce the friction opposing the rotation between cylinder 5 and cylinder 6.

According to another possibility, piston 5b (FIG. 5) while being hollow is closed at its end 5d situated in tubular member 3.

In all cases, piston 5 has a reduced cross-section so that the volume of high pressure liquid, displaced during the sliding movements, is relatively small. The reduced section of piston 5 is possible because this piston is subjected to practically no transverse stress.

Vent holes such as 18 are provided in the wall of cylinder 6 for discharging the air, during movements of bearing 9, contained inside this cylinder.

The operation of a suspension in accordance with the invention follows immediately from the explanations which have been given above.

The axial thrust is transmitted by piston 5, 5b of small active section; this small section is compatible with the range of sliding movements (because the telescopic leg is in the vicinity of wheel 1) and with the high fluid pressure.

Guiding during sliding and rotation is provided at the level of bearings 8 and 9 between tubular member 3 and cylinder 6. This guiding is effected on large diameter parts, able to resist the transverse parasitic stresses of the suspension; no sealing problem complicates this question of guiding.

Thus is obtained a low rotational resistance of the wheel pivot with element E1 and stops 13 and 16 about element E2 formed by member 3 and piston 5, 5b. This low rotational resistance is obtained by sliding at the level of bearings 8 and 9.

The suspension of the invention is of simple and compact construction, particularly in the transverse direction since all the components are practically coaxial to the axis X—X of the telescopic leg. The sealing off of the pressurized liquid and the rotation of the wheel pivot are ensured under good conditions.

This low rotational resistance which contributes to the smoothness in turning the wheel continues to be ensured correctly at the end of the relative axial travel of elements E1, E2 when one of stops 13, 16 comes into abutment against bearing 9; in fact, since this bearing 9 is mounted freely rotatable about member 3, the parasitic friction torque created by this abutment remains low.

I claim:

1. An oleopneumatic suspension having a substantially vertical telescopic leg for use in a vehicle steering wheel assembly, comprising:
    a lower element for supporting a vehicle wheel connected by a substantially transverse articulated lever to the structure of the vehicle,
    an upper element articulated to the structure of the vehicle and serving to guide the lower element, these two elements being slidable in relation to each other along an axis, and
    means for causing a pressurized liquid to act between said elements in such a way that this liquid tends to separate the two elements one from the other along said axis,
    the improvement being that one of the two elements includes
        (i) an elongated tubular member having at one end a bore and an elongated piston of no greater diameter throughout its length than said bore, said piston being adapted for sealed sliding in this bore in a direction parallel to its longitudinal axis, the pressurized liquid being contained in the inner volume of this tubular member sealed by the piston,
    whereas the other element includes
        (ii) a cylinder surrounding the tubular member and coaxial therewith, this cylinder being closed at one end by a bottom against which said piston bears.

2. The suspension as claimed in claim 1, wherein the tubular member and the piston belong to the upper element of the telescopic leg, the means for causing pressurized liquid to act in the tubular member including an oleopneumatic accumulator fixed to the structure of the vehicle, and wherein the lower element comprises the cylinder surrounding the tubular member.

3. The suspension as claimed in claim 1, wherein the tubular member and the piston belong to the lower element of the telescopic leg, and the cylinder surrounding the tubular member belongs to the upper element and is articulated to the structure of the vehicle, and wherein the means for causing the pressurized liquid to act in the tubular member includes an oleopneumatic accumulator fixed to the lower element.

4. The suspension as claimed in claim 3, wherein the tubular element is slidably and rotatably mounted in the cylinder by means of two bearings disposed respectively at the open end of the cylinder and at the end of the tubular member housed in the cylinder, and wherein the bearing situated at the end of the tubular member housed in the cylinder is mounted axially interlocked with this tubular member but free to rotate.

5. The suspension as claimed in claim 4, including stops for limiting the relative sliding of the two elements, wherein these stops are formed by two sleeves made from an elastomer material disposed radially inside the cylinder, and axially situated towards the ends of the cylinder.

6. The suspension as claimed in claim 5, wherein the stops are situated on each side of the freely rotatable bearing, and wherein the bearing cooperates at the end of travel with one of said stops.

7. The suspension as claimed in claim 1, wherein a ring having an inner diameter adjusted to that of the piston is centered at the lower part of the cylinder for limiting the relative sliding of said elements under a maximum load.

8. The suspension as claimed in claim 2, wherein the tubular element is slidably and rotatably mounted in the cylinder by means of two bearings disposed at the open end of the cylinder and at the end of the tubular member housed in the cylinder, respectively, and wherein the bearing situated at the end of the tubular member housed in the cylinder is mounted axially interlocked with this tubular member but free to rotate.

9. The suspension as claimed in claim 8, including stops for limiting the relative sliding of the two elements, wherein these stops are formed by two sleeves made from an elastomer material disposed radially inside the cylinder, and axially situated towards the end of the cylinder.

10. The suspension as claimed in claim 9, wherein the stops are situated on each side of the freely rotatable bearing, and wherein the bearing cooperates at the end of travel with one of said stops.

11. The suspension as claimed in any one of the preceding claims, wherein the piston is formed by a hollow cylindrical body, closed at its end abutting against the bottom of the cylinder, the other end of this piston which gives into the inner volume of the tubular member being open.

12. An oleopneumatic suspension having a substantially vertical telescopic leg for use in a vehicle steering wheel assembly, comprising:

a lower element for supporting a vehicle wheel connected to the structure of the vehicle by a substantially transverse articulated lever;

an upper element articulated to the structure of the vehicle and serving to guide the lower element, the upper and lower elements being slidable in relation to one another along an axis, and means for causing a pressurized liquid to separate the two elements from one another, the improvement being that one of the two elements includes an elongated tubular member filled with said pressurized liquid and having at one end a bore sealed by an elongated piston of no greater diameter than said bore throughout its length so that said piston can slide freely away from said elongated tubular member along its longitudinal axis without liquid dampening, said pressurized liquid serving only to damp shock forces which act to slide said piston toward said elongated tubular member, whereas the other element includes a cylinder surrounding the tubular member and coaxial therewith, this cylinder being closed at one end by a bottom against which said piston bears.

13. The suspension as claimed in claim 12, wherein said bore is smaller than the cross sectional area through said end of said elongated tubular member and concentrically located therein in order to minimize transverse forces between the upper and lower elements by retaining said piston away from the interior surface of said elongated tubular member.

* * * * *

UNITED STATES PATENT AND TRADEMARK OFFICE
CERTIFICATE OF CORRECTION

PATENT NO. : 4,286,802
DATED : Sep. 1, 1981
INVENTOR(S) : Roche

It is certified that error appears in the above—identified patent and that said Letters Patent is hereby corrected as shown below:

The Assignment should be corrected as follows:

Assignees: Societe Anonyme Automobiles Citroen, France
Automobiles Peugeot, France Signed and Sealed this Twenty-sixth Day of January 1982

[SEAL]

Attest:

GERALD J. MOSSINGHOFF

Attesting Officer

Commissioner of Patents and Trademarks